US005232123A

United States Patent [19]

Richardson et al.

[11] Patent Number: 5,232,123

[45] Date of Patent: Aug. 3, 1993

[54] LITERATURE DISPENSING MECHANISM

[76] Inventors: Robert G. Richardson, 518 Fairview, Salina, Kans. 67401; William R. Duey; Sherri R. Duey, both of R.R. 3, Centerville, Iowa 52544

[21] Appl. No.: 898,327

[22] Filed: Jun. 12, 1992

[51] Int. Cl.[5] ........................ B65H 3/02; B65G 59/06

[52] U.S. Cl. ..................................... 221/259; 221/155

[58] Field of Search ............... 221/259, 154, 155, 304; 194/235, 253, 257

[56] References Cited

U.S. PATENT DOCUMENTS

| | | | |
|---|---|---|---|
| 479,688 | 7/1892 | Weller | 221/259 X |
| 537,811 | 4/1895 | Bowie et al. | 221/259 X |
| 939,746 | 11/1909 | Rosenfield | 194/253 |
| 1,621,960 | 3/1927 | Stewart et al. | 221/304 X |
| 1,654,877 | 1/1928 | Hill | 194/257 |
| 1,655,325 | 1/1928 | Mitchusson et al. | 194/253 X |
| 3,342,373 | 9/1967 | Weitzman | 221/154 X |
| 3,536,231 | 10/1970 | Knickerbocker | 221/155 |
| 3,917,114 | 11/1975 | Grosse | 221/259 X |
| 4,401,202 | 8/1983 | Gitlin et al. | 194/235 X |
| 5,018,614 | 5/1991 | Ruckert | 221/259 X |

FOREIGN PATENT DOCUMENTS

| | | | |
|---|---|---|---|
| 659146 | 12/1986 | Switzerland . | |
| 22473 | of 1914 | United Kingdom . | |
| 1175668 | 12/1969 | United Kingdom . | |

*Primary Examiner*—Robert P. Olszewski
*Assistant Examiner*—Dean A. Reichard

[57] ABSTRACT

A literature dispensing mechanism which will dispense a single unit of literature from an orderly stack of literature when manually actuated by a coin slide.

1 Claim, 6 Drawing Sheets

LITERATURE DISPENSING MECHANISM

BACKGROUND OF THE INVENTION

1. Field of the Invention

The invention relates generally to a mechanism that will dispense a single unit of paper literature when manually actuated. The mechanism is attached to a coin slide to enable collection of coinage for each unit of literature dispensed. The mechanism is mounted in a container in a manner which allows it to remove the lower unit from a stack of literature. This container also facilitates secure holding of coinage used in the coin slide.

2. Description of the Prior Art

The current literature distribution systems in common usage are simple box containers that allow removal of one or more pieces of literature at no charge. The current systems are generally unprofessional in appearance and present several problems. The current systems do not prevent the public from taking multiple copies of the literature. They do not allow the owner to collect a fee for each piece of literature that is distributed. Current systems are not weather resistant and often allow damage to the contents from the elements such as moisture and sunlight. This invention provides a solution to all of these problems.

SUMMARY OF THE INVENTION

This invention relates to a literature dispensing mechanism that is housed in a weather resistant box and is activated by a vending coin slide.

The mechanism consists of a connecting bar which is attached to the coin slide. A U-bolt attaches to the connecting bar by means of a bearing attachment that allows the u-bolt to rotate. Pieces of square metal bar, ejector bars, have holes drilled through them and are bolted to each end of the u-bolt, perpendicular to the bolt and point upward. A small flat plate, ejector plate, is welded to the upper end of the square bars. A friction material, ejector friction pad, is attached to the upper side of this ejector plate. Just below this ejector plate a guide shaft is installed through holes in the upper ends of both ejector bars. A roller bearing is press fitted on each end of this shaft. These roller bearings are guided in a track cut in a plastic material, plastic guide track plates, which is attached to the side walls of the vending box. This track is cut in a somewhat elliptical pattern to route the guide shaft roller bearings through a somewhat elliptical route as the coin slide is pushed in and then pulled out.

When the coin slide is pushed in, the mechanism forces the roller bearings on the guide shaft to travel inward and upward along the elliptical path cut in the plastic guide track plates. As the coin slide reaches its inward most position, torsion springs cause each end of the guide shaft to stay on the upper plan of the elliptical path. The torsion springs prevent the shaft from falling backwards and reversing direction of travel in the track. At this point, the guide shaft has been raised to its upper level position and the ejector friction pad makes contact with the literature through an opening in the floor plate of the literature holding area. As the coin slide is pulled back to its starting position, the guide shaft and roller bearing follow the upper level track towards the front of the box. The ejector friction material on the ejector plate pulls the lowermost piece of literature from the holding rack and slides it partially out through an opening in the face of the literature dispensing box. Just before the coin slide reaches the original starting position the guide shaft roller bearings are allowed to travel downward in the elliptical track in the guide track plates and releases the ejector friction material on the slide plate from the literature unit. The guide shaft roller bearings then follow in the track back to the starting position in the lower plane of the elliptical track. An adjustable gate tab extends down into most of the literature dispensing opening and prevents more than one unit of literature from exiting the container at a time and allows only one unit of literature to be dispensed each time the ejector friction pad pulls it out of the box.

The lid is removable from the box to allow easy loading and includes a lid lock to secure contents. The box has a front literature display holder of clear material to display one cover sheet of the literature being dispensed. It also displays operating instructions. Coinage falls out of the coin slide when it is actuated and falls down into a coin collection area. Access to this coin collection area is through a coin access panel secured with a coin access panel lock. It is the object of the invention to provide a mechanism that will dispense a single unit of paper literature when manually actuated and to enable collection of coinage for each unit of literature dispensed.

BRIEF DESCRIPTION OF THE DRAWINGS

For illustration of the invention, reference is made to the accompanying drawings in which.

DESCRIPTION OF THE PREFERRED EMBODIMENT

Figure 1:
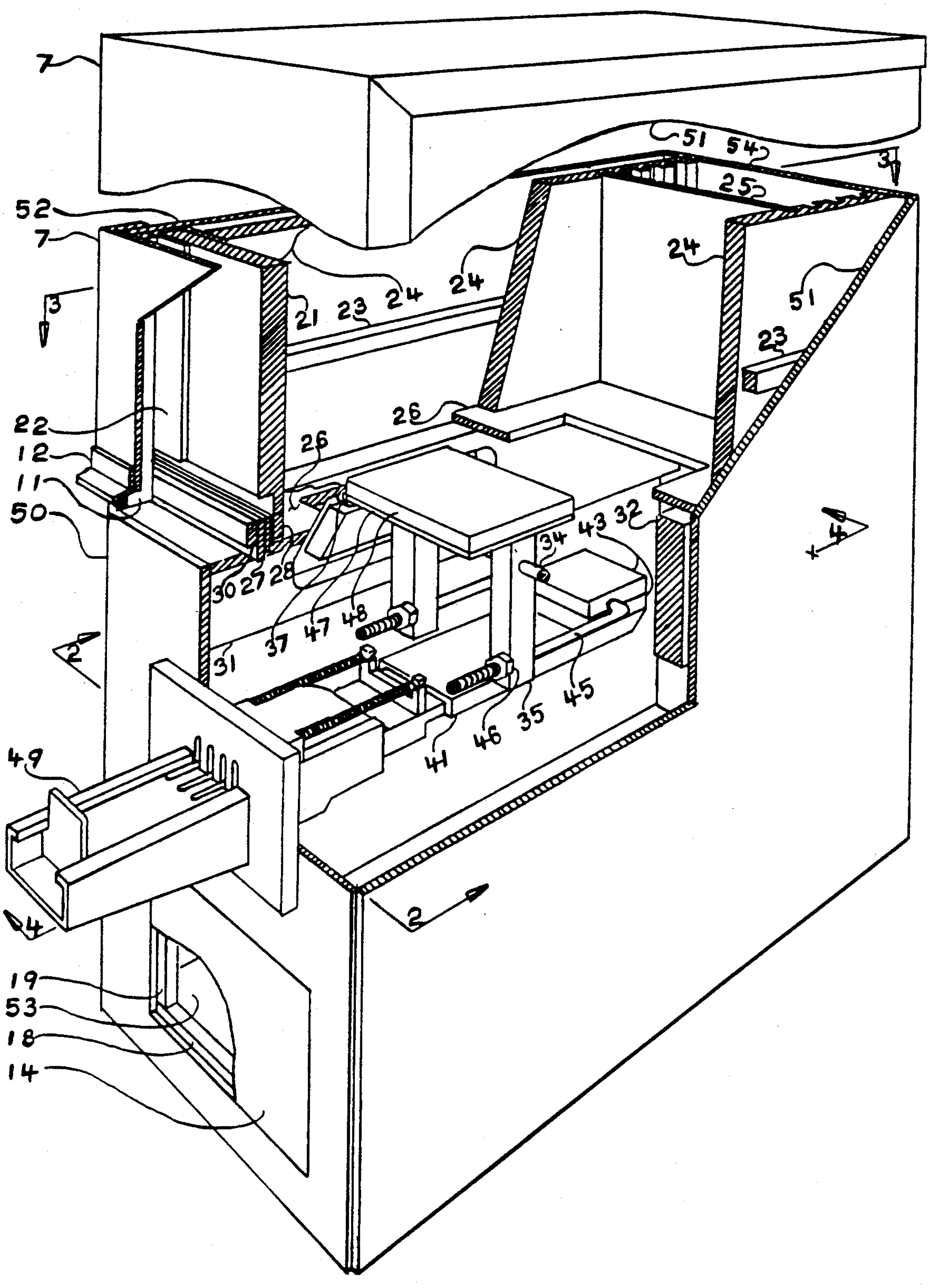
FIG. 1 is a pictorial view of this invention.
Figure 4:
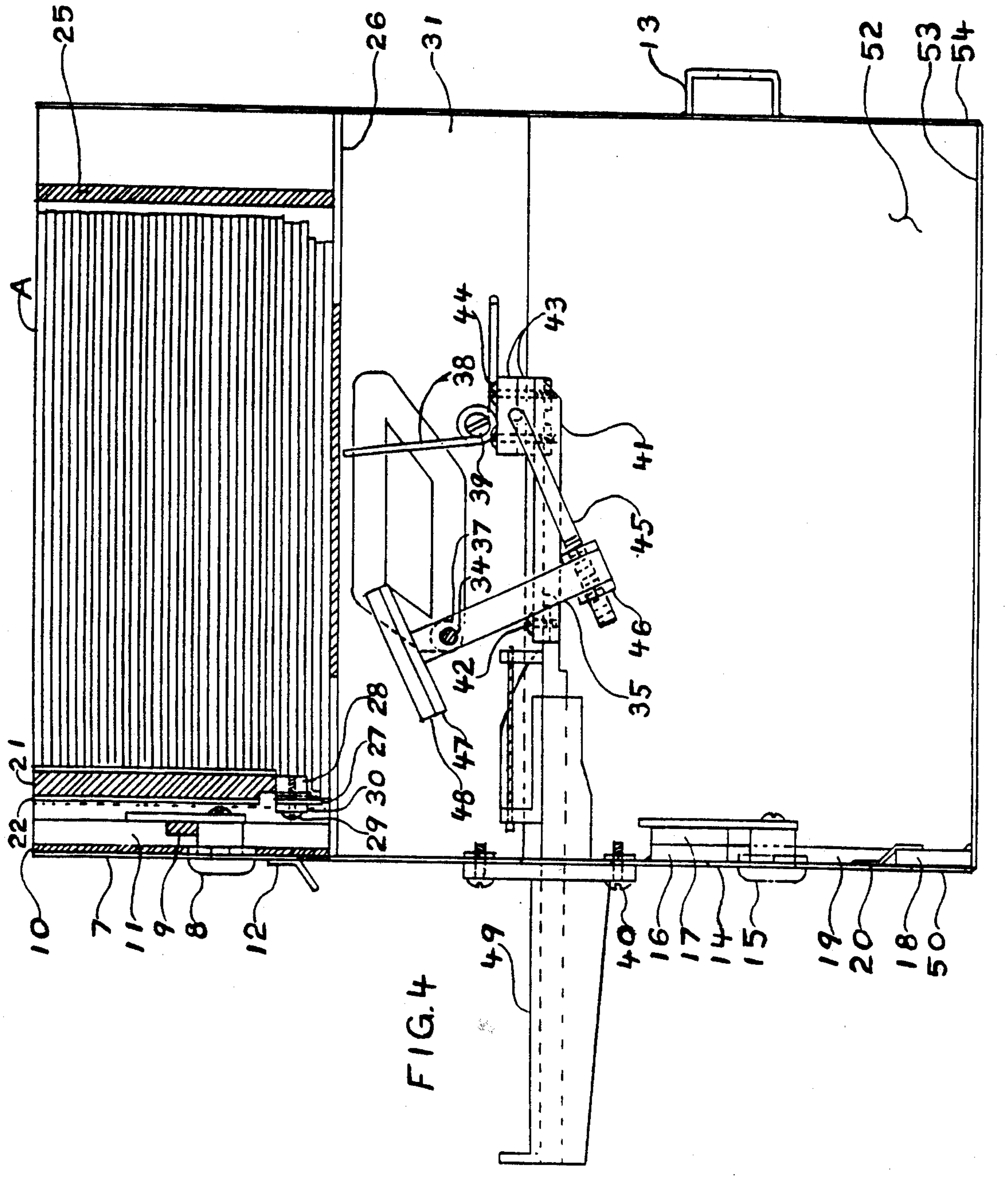
FIG. 4 is a side cross-sectional view of the literature removing mechanism of this invention taken along line 4—4 of FIG. 1. This cross-sectional shows the mechanism in the starting position.

FIG. 1 illustrates a literature dispensing box which dispenses a single unit of literature through a slot opening each time the coin slide 49 is actuated. The literature dispensing box comprises a housing defined by a lower front panel 50 which attaches to side panels 51, 52 and a bottom panel 53, a back panel 54 attached to the side panels 51, 52 and a bottom panel 53 and a removable lid 7 that attaches to the back panel 54, sides 51, 52 and lower front panel 50 by means of pins and a front lid lock 8 as shown in FIG. 4. The pins are attached to the back panel 54 and extend to the rear. The pins fit through two corresponding holes in the back lip of the lid 7.

Referring to FIG. 4 a lid locking bar 9 is attached to side panels 51 and 52. A lid lock 8 is attached to the lid 7. A seal strip 10 is attached to a seal mounting bar 11 that is attached to the side panels 51 and 52 along the top edges and the front exposed edges. A seal strip 10 and seal mounting bar 11 also are attached near the top edge of the back panel 54. An advertising panel is attached to the front panel of the lid 7 by means of screws. A weather cap 12 is attached to the bottom edge of the lid 7. Mounting brackets 13 can be added to the back panel 54.

A coin access opening is cut into the lower front panel 50 A long top security bar 16 is attached to the inside top edge of the coin access opening in the lower front panel 50. A short top security bar 17 is attached to the long top security bar 16. A bottom security bar 18 is attached to the inside bottom of the coin access opening in the lower front panel 50. Side security bars 19 are attached to the inside of the coin access opening in the lower front panel 50. A coin access panel lock 15 is mounted in the coin access panel 14. A security lip 20 is attached to the inside bottom edge of the coin access panel 14. The coin access panel 14 attaches to the lower front panel 50 by means of a coin access panel lock 15 and the security lip 20.

Referring to FIG. 1, a literature holding rack is located in the upper portion of the literature dispensing box. It is comprised of a front literature holding rack panel 21 that slides in guide channels 22 that are attached to the side panels 51 & 52. Side spacer bars 23 are attached to the side panels 51 & 52. Side literature holding rack panels 24 are attached to the side spacer bars 23 by means of flathead machine screws. Vertical slots are cut into the side literature holding rack panels 24. Theses slots are used to hold a rear literature holding rack panel 25. This rear literature holding rack panel 25 can be adjusted for various lengths of literature by placing it in various slots. A literature holding rack floor plate 26 with a rectangular opening is located at the bottom of the literature holding area. Adjustable gate tabs 27 are attached to a gate tab mounting bar 28 by means of bolts 29 and a gate tab retaining bar 30. The gate mounting bar 28 is drilled and tapped to accept the bolts 29.

Figure 2:
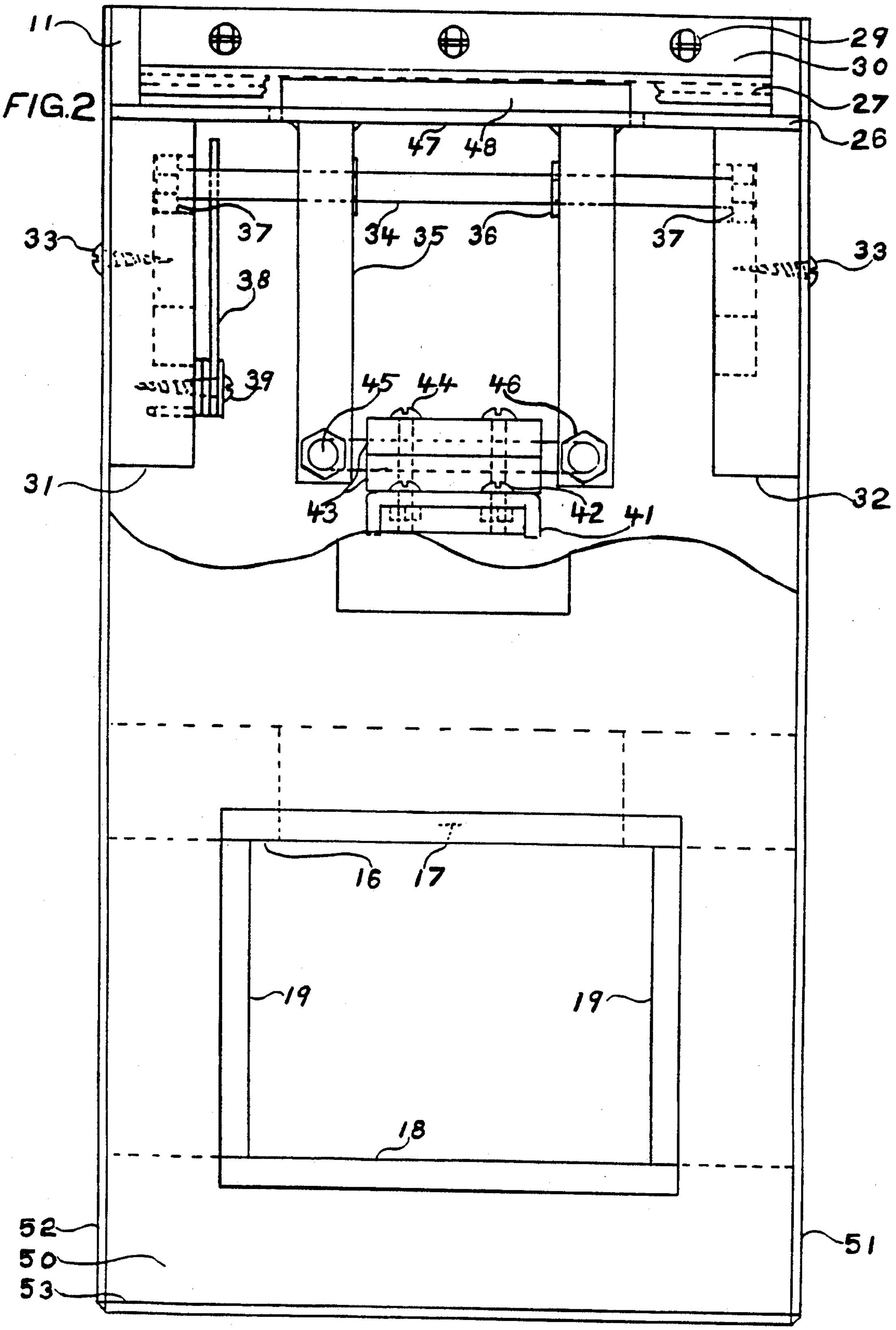
FIG. 2 is a front cross-sectional view of this invention taken along line 2—2 of FIG. 1 with the upper half of the lower front panel not shown and the lid removed for clarity.
Figure 3:
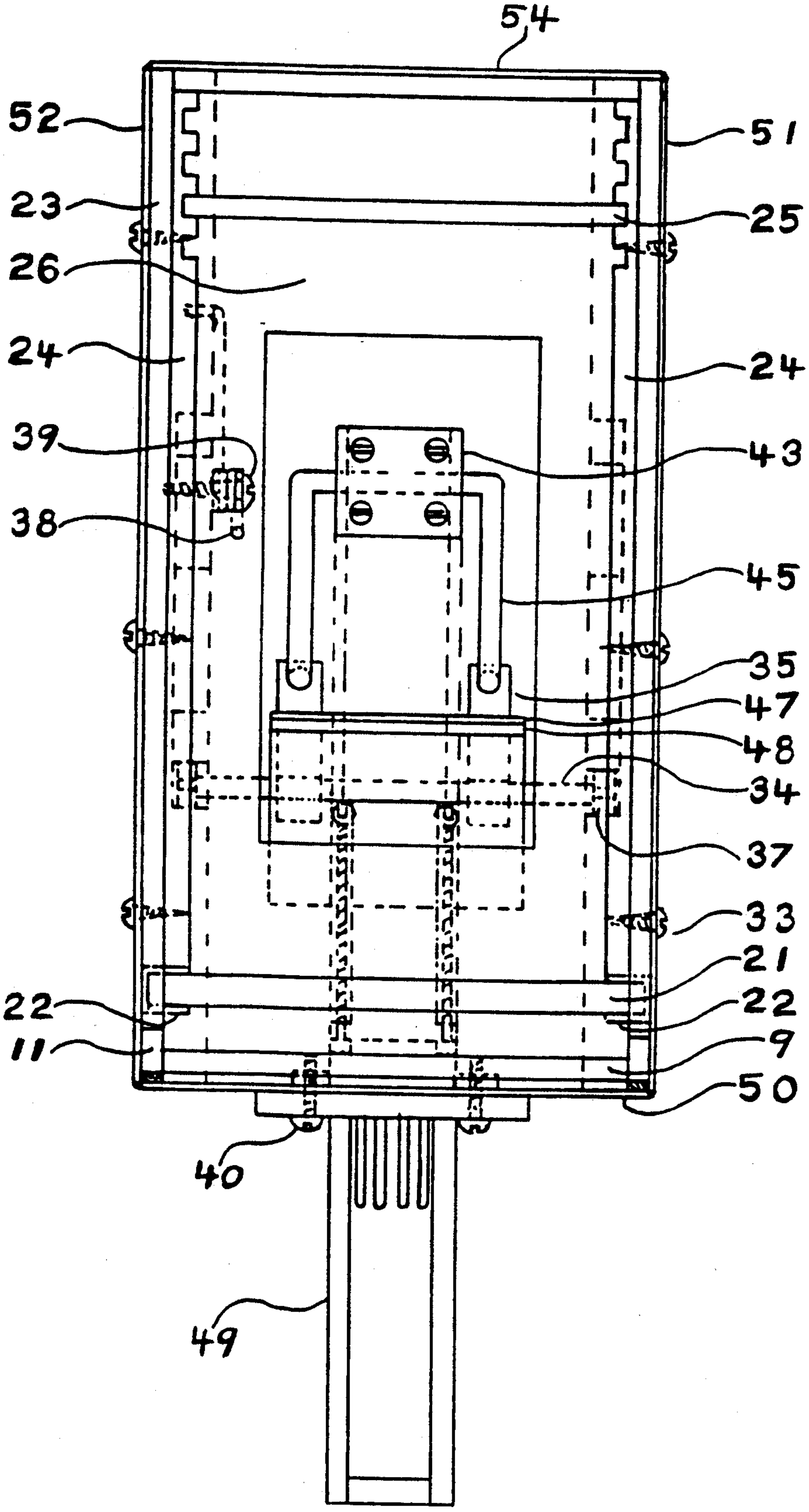
FIG. 3 is a top cross-sectional view of this invention taken along line 3—3 of FIG. 1. This view is shown with the literature holding rack empty, the lid removed and the literature removal mechanism in the starting position.

Referring to FIG. 2, the plastic guide track plates 31 & 32 are attached to the side panels 51 & 52 by means of screws 33. The floor plate 26 is placed on top of the plastic guide track plates 31 & 32 and is held in place by the side literature holding rack panels 24 as shown in FIG. 1. Referring again to FIG. 2, a guide shaft 34 extends through two holes in the ejector bars 35. The guide shaft 34 is held in place by 2 "E" retainer rings 36. Roller bearings 37 are attached to each end of the guide shaft 34 by press fit. The bearings 37 travel in a groove that is out in an elliptical path into the guide track plates 31 & 32. A torsion spring 38 is attached to the plastic guide track plate 31 by means of a screw 39. The torsion spring has a short tension tab that is inserted into a hole in the guide track plate 31.

Referring to FIG. 4. a coin slide 49 is attached to the lower front panel 50 by means of vandal resistant machine screws 40. The coin slide 49 is attached to a connecting bar 41 by means of machine screws & nuts 42. A bearing surface has been grooved in each of two plastic blocks 43. The two plastic blocks 43 are placed together around a u-bolt 45 and then bolted to connecting bar 41 by means of machine screws and nuts 44. The u-bolt 45 is threaded on both ends and connects to the two ends of ejector bars 35 by means of lock nuts 46. The ejector bars 35 are attached to an ejector plate 47. An ejector friction pad 48 is attached to the ejector plate 47.

Figure 5:
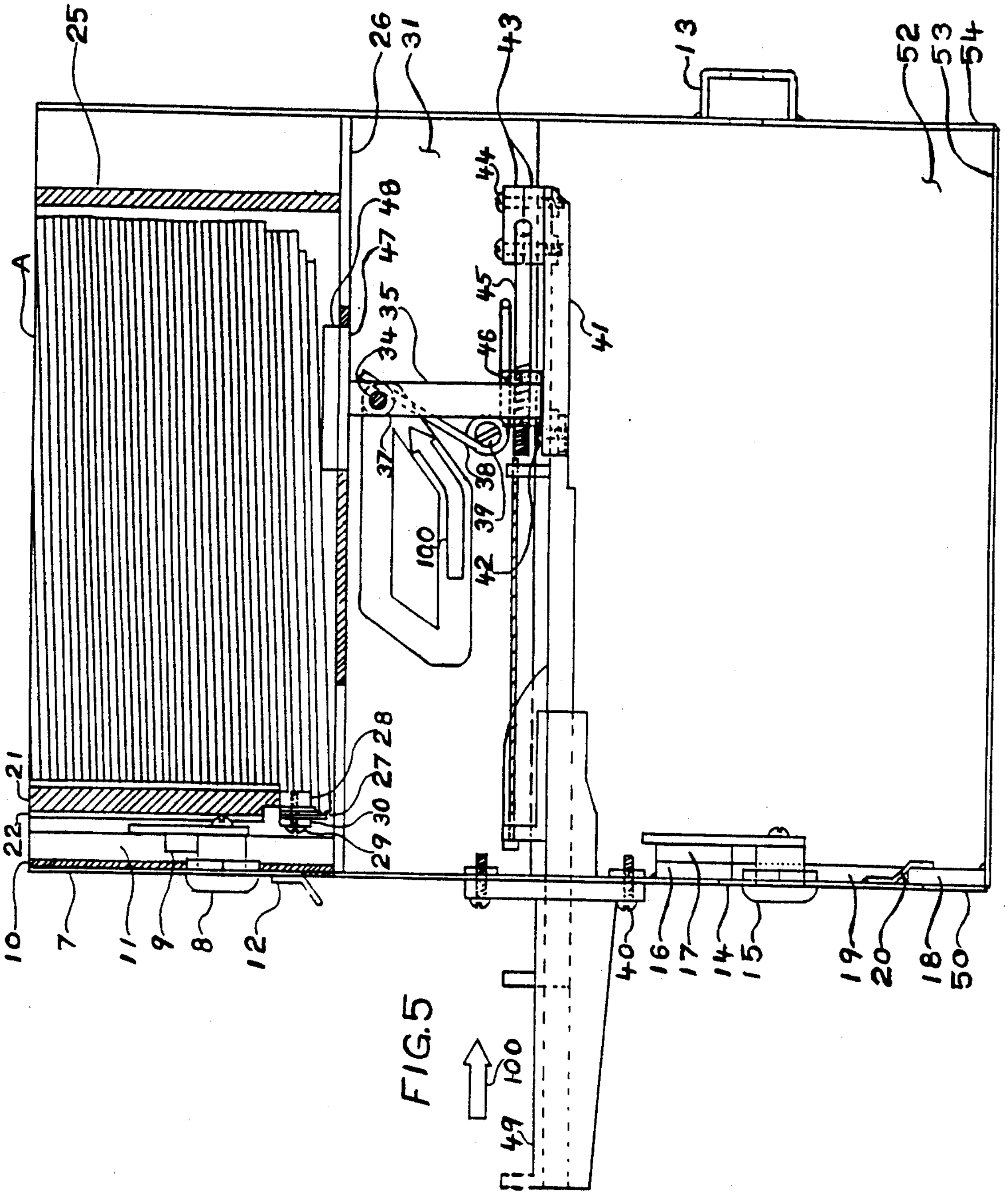
FIG. 5 is the same view as FIG. 4, but the mechanism is in the literature contact position.

Referring to FIG. 5 which depicts the literature removal mechanism in the literature contact position, the coin slide 49 is pushed all the way inward and has forced the roller bearings 37 to follow the grooved track in the guide track plates 31 and 32 and depress the torsion spring 38. The ejector plate 47 and ejector friction pad 48 have raised up just barely through the opening in the literature holding rack floor plate 26 and makes contact with a piece of literature. Directional arrows 100 show the direction of movement of the coin slide 49 and the roller bearings 37, guide shaft 34 and literature ejection assembly.

Figure 6:
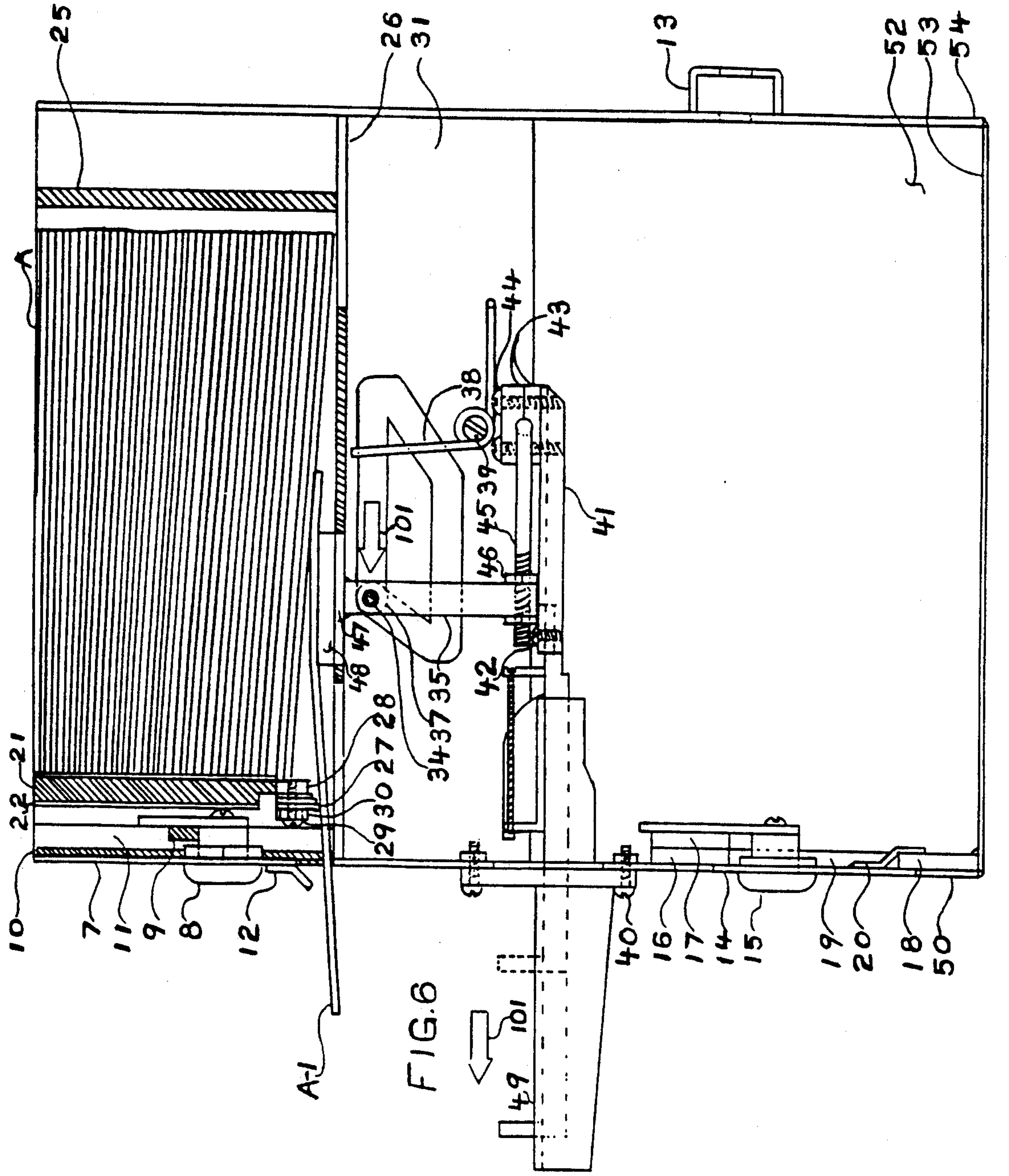
FIG. 6 is the same view as FIG. 4, but with the literature removal mechanism in the literature dispensing position.

Referring to FIG. 6 which depicts the literature removal mechanism in the ejection position, the coin slide 49 is pulled to near its starting position and has forced the roller bearings to follow the grooved track in the guide track plates 31 and 32. The torsion spring forces the mechanism to stay on the upper track. As the friction pad is pulled along, a piece of literature A. is also pulled along. Directional arrows 101 show the direction of movement of the coin slide 49 and the roller bearings 37, guide shaft 34 and literature ejection assembly. The gate tabs 27 prevent more than one unit of literature from the stack of literature A from going past. The single piece of literature A1 is ejected from the machine.

I claim:

1. A literature dispensing mechanism which when actuated by a coin slide mechanism dispenses a unit of literature from the bottom of a stack of literature and dispenses the unit of literature through an opening in the front of a rectangular container which comprises:

(a) a connecting bar attached securely to the coin slide mechanism by means of bolts to provide a means of linking the coin slide mechanism with the literature dispensing mechanism causing them to operate in unison; and (b) a bearing attachment that connects a u-bolt to the connecting bar in a manner to allow the u-bolt to pivot yet remain connected to the connecting bar during the dispensing process; and (c) two ejector bars, each attached on one of their ends to opposite ends of the u-bolt and on their other ends attached to opposite edges of the bottom of an ejector plate; and (d) a guide shaft with roller bearings on each end that extends through holes in the ejector bars and whose roller bearings fit in grooved tracks that have been cut in an elliptical pattern in plastic guide track plates; and (e) said plastic guide track plates being mounted one to each inside side wall of the container and having guide tracks cut in an elliptical pattern to guide the roller bearings and the guide shaft through one cycle as the coin slide mechanism is pushed inward and pulled outward; and (f) a torsion spring that is attached to at least one of the plastic guide track plates near an upper rear portion of the grooved tracks in such a way as to flex under tension when in contact with the guide shaft and force the guide shaft to continue on a one way elliptical route around said grooved tracks and (g) an ejector plate attached to the ends of the ejector bars, friction material attached to the upper surface of the ejector plate; and when the literature dispensing mechanism moves through its elliptical path the ejector plate with attached friction material are moved upward coming in contact with the unit of literature and when further actuated moves towards the front of the container and moves the unit of literature through said opening: and (h) an adjustable gate tab which is made up of a rubber strip that is sandwiched between a metal mounting bar and a metal retaining strip and held in place by bolts that pass through all three materials and when tightened hold the rubber strip at a precise height above a floor plate to prevent more than one piece of literature from being dispensed at a time.

* * * * *